United States Patent [19]
Even

[11] Patent Number: 6,088,353
[45] Date of Patent: Jul. 11, 2000

[54] SORTING NETWORKS HAVING REDUCED-AREA LAYOUTS

[75] Inventor: Shimon Even, Watchung, N.J.

[73] Assignee: Lucent Technologies, Inc., Murray Hill, N.J.

[21] Appl. No.: 08/889,772

[22] Filed: Jul. 8, 1997

[51] Int. Cl.[7] .......................... H04L 12/50; H04Q 11/00; H04Q 19/00
[52] U.S. Cl. ...................... 370/386; 370/411; 340/825.79
[58] Field of Search ..................... 370/389, 411, 370/412, 254, 422, 429, 361, 386, 388; 340/825.79, 825.8, 825.89

[56] References Cited

U.S. PATENT DOCUMENTS

| | | | |
|---|---|---|---|
| 5,130,976 | 7/1992 | Hickey et al. | 370/60 |
| 5,216,420 | 6/1993 | Munter | 340/825.79 |
| 5,272,767 | 12/1993 | Asmuth et al. | 382/41 |
| 5,392,279 | 2/1995 | Taniguchi | 370/60 |
| 5,636,210 | 6/1997 | Agrawal | 370/390 |
| 5,875,190 | 2/1999 | Law | 370/395 |

OTHER PUBLICATIONS

C.D. Thompson, "The VLSI Complexity of Sorting," IEEE Trans. Computers, vol. C32, No. 12, pp. 1171–1184, Dec. 1983.

D.S. Wise, "Compact Layouts of Banyan/FFT Networks, "*VLSI Systems and Computations*, H.T. Kung et al., (ed.), pp. 186–195 (Computer Science Press, 1981).

*Primary Examiner*—Alpus H. Hsu
*Assistant Examiner*—Duc Ho

[57] ABSTRACT

Improved layouts for sorting networks having $O[N \log^2 N]$ comparison circuits, a method therefor, and improved switches incorporating such layouts, are disclosed. An improved layout reduces grid-area requirements for Batcher's bitonic sorting network to an area of $4N^2$ grid units. The improved layout results from (i) slanting a substantial portion of each link between comparison circuits 45° with respect to a conventional layout of the network, (ii) incorporating "flip-links," and (iii) not restricting all comparison circuits having the same network depth to placement in a single grid column.

16 Claims, 10 Drawing Sheets

SORTING NETWORKS HAVING REDUCED-AREA LAYOUTS

FIELD OF THE INVENTION

The present invention relates to sorting networks. More particularly, the invention relates to a reduced-area layout for sorting networks.

BACKGROUND OF THE INVENTION

Sorting networks are useful as fast circuits for performing data sorting. Sorting networks consist of input terminals, a plurality of comparison circuits, interconnections or links and output terminals. A comparison circuit is operable to compare two values appearing at its inputs and to route them to respective outputs based on those values. For example, the lesser of the two values may be directed to a predetermined first output and the greater of the two values may be directed to a predetermined second output of the comparison circuit. Sorting networks are useable, for example, in conjunction with parallel processing for computers, and as message routers for sorting messages such as in data and telecommunication networks.

It is desirable to implement sorting networks into an ever-decreasing area within an electrical circuit. Decreasing the comparison circuit count may help in minimizing sorting network layout area. The earliest sorting networks required $(N)^2/2$ comparison circuits, where N is the number of signals to be sorted and routed. That requirement was significantly decreased in a bitonic sorting network attributed to K. Batcher requiring $O(N \log^2 N)$ comparison circuits. See, K. Batcher, "Sorting Networks and their Applications," Proc. AFIPS Spring Joint Computing Conf., vol. 32, pp. 307–314, 1968. A later variation of Batcher's bitonic network, reported by D. E. Knuth, is described later in this specification. See, Knuth, *The Art of Computer Programming, Vol. 3: Sorting and Searching,* Section 5.3.4, (Addison-Wesley , 1973).

The area required for a sorting network is not, however, necessarily controlled by the number of comparison circuits in the network. An additional important consideration is the area required for the interconnects, e.g., wires or the like, linking the various elements of the sorting network. As such, the physical layout of a sorting network may be of paramount importance in minimizing area requirements.

SUMMARY OF THE INVENTION

The present invention is directed to a method for laying out a sorting network, and to sorting network layouts resulting therefrom. It is known that Batcher's bitonic network can be implemented in an area of $O(N^2 \cdot \log^2 N)$ grid units. In U.S. patent application Ser. No. 08/889,632, filed on even date herewith and assigned to the present assignee, a method and layouts of Batcher's bitonic sorting network implementable in an area of $20.25N^2 + o(N^2)$ and $11.25N^2 + o(N^2)$ grid units were described. That application is incorporated herein by reference. The improved layout described herein allows Batcher's bitonic sorting network to be laid out in an area of $4N^2$ grid units for a network of N inputs.

According to the present method, comparison circuits having the same network depth are not necessarily placed in a single grid column as in conventional sorting network layouts, such as in Batcher's bitonic sorting network. In particular, in a hitherto unknown arrangement, a portion of such same-network-depth comparison circuits are placed in one or more grid rows. Suprisingly, and quite advantageously, such an arrangement of comparison circuits provides a layout requiring significantly less grid area than conventional layouts of Batcher's bitonic network.

Moreover, the aforementioned layout is suitably configured for making additional modifications reducing grid area requirements. In one such additional modification, a substantial portion of each link interconnecting the inputs and outputs of all comparison circuits is "slanted" by 45° relative to conventional layouts. In a second additional modification, "flip-linking" is incorporated into the recursive elements of the network structure. In conventional layouts of sorting networks, such as Batcher's bitonic sorting network, such flip links are not incorporated. Rather, the N outputs of the lower bitonic sorter are flipped before delivery to the bitonic merger $M_{n+1}$. Placing the flip-links within the recursive structure, as practiced herein, further reduces layout area.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION OF THE INVENTION

An exemplary sorting network has N input terminals and N output terminals and a plurality of comparison circuits and interconnects or links. If N signals, representing N values, such as, for example, real numbers or address values, are fed into the input terminals, the same signals appear sorted on the output terminals. Sorting networks can be implemented to process electronic, optical or other types of signals. It will be appreciated that the physical implementation of the network will vary depending upon the signal-type being processed, e.g., electronic, optical.

Figure 1:
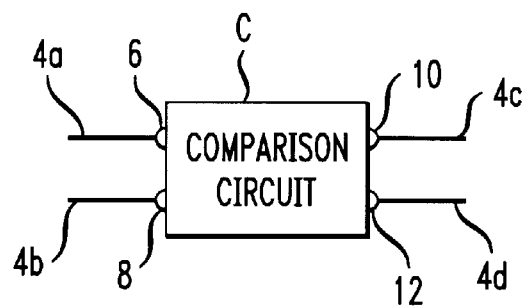
FIG. 1 shows a simplified illustration of a comparison circuit C.

FIG. 1 shows a simplified illustration of a comparison circuit C. A comparison circuit contains logic circuits, memory cells and the like, as described in Weste et al., *Principles of CMOS VLSI Design,* Section 9.4, (Addison- Wesley, 1985). That publication, and all others mentioned in this specification are incorporated by reference herein. A comparison circuit, such as the comparison circuit C, is operable to sort two signals. For clarity and ease of presentation, such signals will hereinafter be referred to as "numbers." Further, as used herein, the term "vector" is defined as a sequence of signals.

The comparison circuit C has two input terminals 6, 8 and two output terminals 10, 12, as illustrated in FIG. 1. If two numbers x, y are fed to the two inputs 6, 8, the same numbers x, y emerge sorted on the output terminals 10, 12. It is assumed herein that the number, say x, having the smaller value emerges upwardly, i.e., on terminal 10 in FIG. 1, and the number, y, having the larger value emerges downwardly, i.e., on terminal 12. To simplify the following description, designations for numbers (signals) delivered to the terminals, and the terminals receiving such numbers, will be used interchangeably.

The networks described herein also have fixed inter connects or links, such as the fixed interconnects 4a–d shown in FIG. 1. Such interconnects are normally implemented, for example, as conductive traces patterned on and throughout integrated circuits, or as optical waveguides in optical circuits. All such interconnects are directed links connecting a network input terminal, not shown, or a comparison circuit output terminal to a comparison circuit input terminal, or a network output terminal, not shown.

It is possible to represent a sorting network by a directed graph, wherein comparison circuits and network terminals are considered to be vertices, and the interconnects or links are directed edges. The following rules and definitions will be used herein with regard to embedding such a graph in a grid. First, the vertices of a graph are mapped to grid-points, with no more than one vertex per grid-point. Second, every edge of the directed graph is represented by a path in the grid, but not grid edge is used in more than one such path. Such a mapping of the graph edges to grid paths is referred to herein as "edge-disjoint" mapping. Two paths may share an intermediate grid-point, but they must cross at that point, i.e., no "knock-knee" or change in direction is allowed. Third, if a vertex is mapped to a grid-point, then all paths representing graph edges incident on this vertex must begin or end at that grid-point, and no path is allowed to pass through that point.

Figure 13:
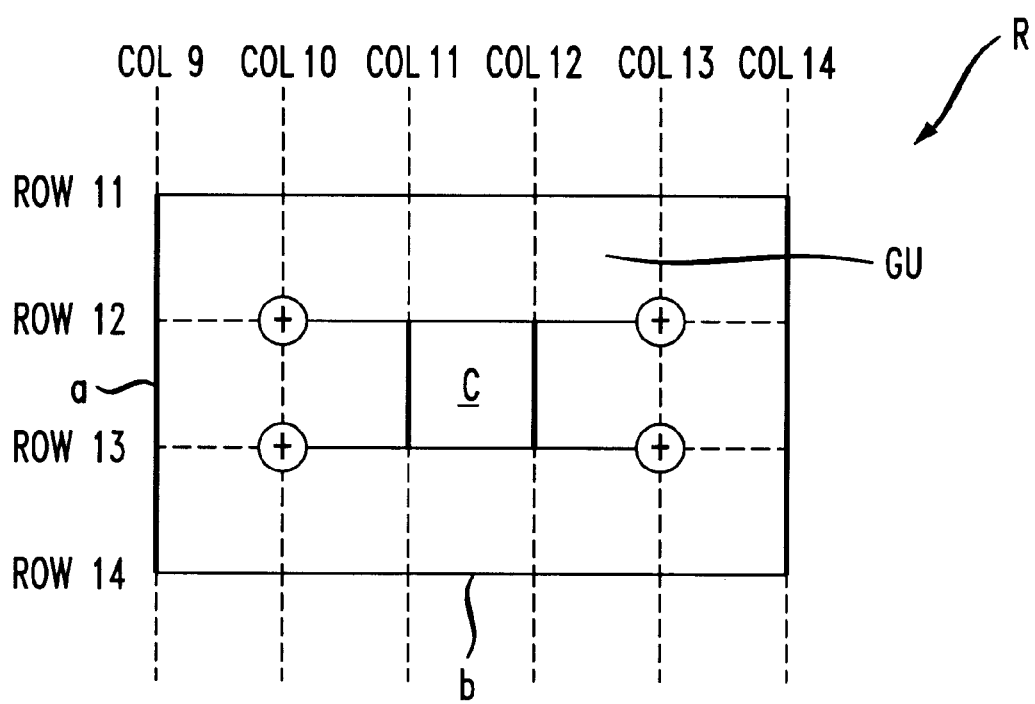
FIG. 13 shows a portion of an exemplary grid for laying out a network and a representation of grid area.

A "graph" describing a network layout is embedded in a grid. FIG. 13 shows a portion of such a grid suitable for laying out a sorting network. The grid portion shown is defined by grid columns col9–col14 and grid rows row 11–row 14. The grid columns represent vertical lines in the grid and grid rows represent horizontal lines. Two adjacent grid columns, such as col12 and col13, intersect two adjacent grid rows, such as row11 and row12, defining a grid unit GU. It will be appreciated that grid units are representative of a portion of the area of a grid. For example, the grid area encompassed by a region bounded by grid columns col9–col14 (side a), and grid rows row11–row14 (side b) is fifteen grid units or GU.

Semiconductor chips are typically laid out in rectangular regions. Thus, the area required for a layout of a sorting network is the area (measured in grid units) of the smallest rectangle that contains such a layout. The grid area of a layout is defined as the least number of grid units in a rectangle that encompasses the layout.

If R is an a×b rectangle, then rectangle R contains at least $[(a-1)\cdot(b-1)]-1$ grid points and at most $(a+1)\cdot(b+1)$ grid points, no matter how the rectangle R is oriented with respect to the grid. Here, a and s are measured in respective vertical and horizontal grid segments, where a vertical grid segment is a line between adjacent grid points within a column and a horizontal grid segment is a line between adjacent grid points within a row. For example, for the rectangle R shown in FIG. 13, a=3 vertical grid segments and b=5 horizontal grid segments, and the number of grid points encompassed by R is $(3+1)\cdot(5+1)=24$. The sides of R need not be parallel to the grid lines and the quantities a and b need not be integers. When a and b are large, the number of grid points is approximately equal to the area of the rectangle in grid units.

It will be appreciated that a grid unit is not arbitrarily small. A grid unit has a minimum size dictated by the state-of-the-art in device fabrication, particularly in terms of minimum feature size, prevailing at any given point in time. For example, assume it is determined that a sorting network requires an area of G grid units. It should be clear that the absolute area, e.g., in square microns, square millimeters, required to implement such a network in, say 1970, is significantly greater than the area required for implementation in 1997. The layout areas presented herein are described in terms of "grid units," which, as it should now be appreciated, is a relative measure o f layout area.

To facilitate description of the present invention, it will be useful to present information concerning conventional sorting network layouts. Such information is presented in Section I, below. The present invention, which is directed to improved layouts of sorting networks having $O[N \log^2 N]$ comparison circuits, such as, for example, Batcher's bitonic network, is described in Section II. The notation "O", i.e., big "O", is defined as follows: a function $f(x)$ is said to be "$O(g(x))$" if there exists a constant, c, such that for every $x, f(x) \leq c \cdot g(x)$. The notation "o", i.e., little "o", is defined as follows: a function $f(x)$ is said to be "$o(g(x))$" if the limit, as x approaches infinity, of $f(x)/g(x)$ is equal to zero.

I. Known Sorting Networks

The area of a rearrangeable network for N inputs is greater than $\frac{1}{2}(N-1)^2$ grid units. In terms of a directed graph, a network is rearrangeable if for every correspondence of the input terminals to the output terminals there are edge-disjoint directed paths connecting each input terminal with its corresponding output terminal. Every sorting network is rearrangeable.

One known sorting network having $O[N \log^2 N]$ comparison circuits is the bitonic sorting network of K. Batcher. Knuth's variation of Batcher's bitonic network is described below. For the purposes of the present specification, a real vector is called "bitonic" if it is first nondecreasing and then nonincreasing, or vice versa. For example, the vector [2,5, 7,8,6,4,3,1] is bitonic. A word of zeros and ones is therefore "bitonic" if it is of the form: $0^a 1^b 0^c 1^d$, and either a or d is zero. According to the zero-one principle, if a network sorts all $2^N$ binary input vectors, then it will sort any N-vector of real numbers. The present description will refer to sorting only zeros and ones. It will be understood, however, that the network applies to any real vector. Moreover, it is assumed for the purposes of illustration that input vectors are equal in size to one another and described by powers of 2, i.e., $N=2^n$. The invention can be utilized, however, if the input vector s are unequal in size and/or are not described as a power of 2.

Figure 2:
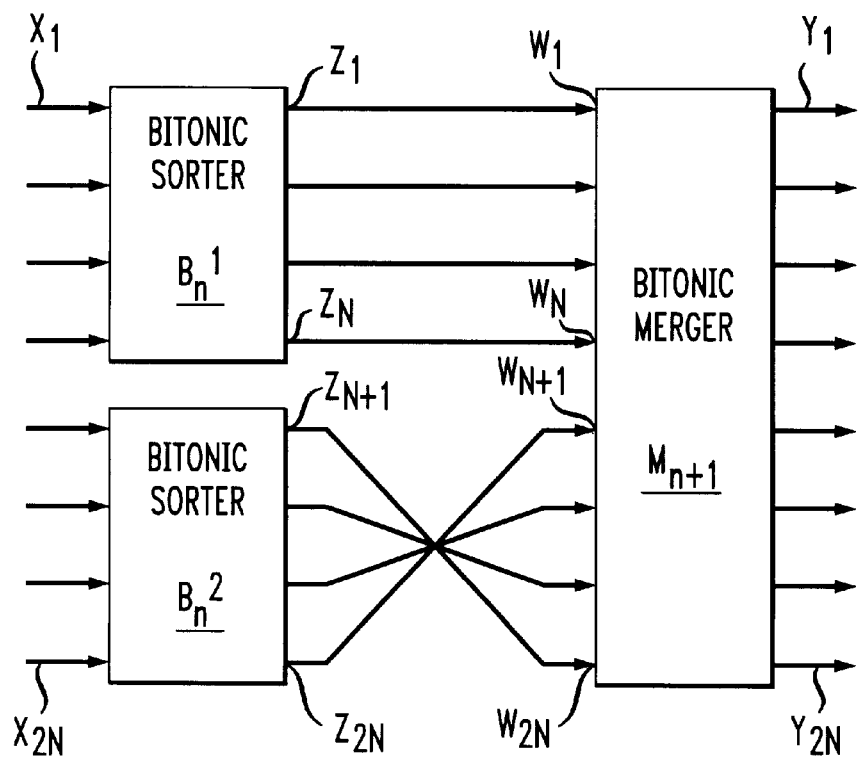
FIG. 2 shows an example of Batcher's bitonic network for sorting.

FIG. 2 shows an example of Batcher's network $B_{n+1}$ for bitonic sorting. The networks described herein have a recursive structure. It will be appreciated by those skilled that explication of such recursive structure is facilitated by examining network construction and related elements in terms of the "n+1st" level.

In the example shown in FIG. 2, the network receives an input vector having 2N arbitrary inputs $x_1, x_2 \ldots x_{2N}$ and generates a sorted output vector having 2N sorted outputs y. The term "arbitrary" is used herein to indicate that the inputs can be in any order, e.g., not sorted, sorted. For the illustration shown in FIG. 2, n=2 and N=4. The arrangement, which is constructed recursively, includes, for $B_{n+1}$, two bitonic sorters and one bitonic merger $M_{n+1}$. The two bitonic sorters include an upper bitonic sorter $B_n^1$ and a lower bitonic sorter $B_n^2$. The bitonic sorters and bitonic merger are constructed of comparison circuits.

Bitonic sorters, such as the upper and lower bitonic sorters $B_n^1, B_n^2$, receive at their inputs arbitrary vectors and deliver, at their outputs, sorted vectors. The bitonic merger $M_{n+1}$ sorts bitonic input vectors.

In more detail, the 2N arbitrary inputs $x_1, x_2 \ldots x_{2N}$ are received by the bitonic sorters $B_n^1, B_n^2$, N inputs to each. The N sorted outputs $z_1, z_2 \ldots z_N$ of the bitonic sorter $B_n^2$ are delivered, in order, to the first N inputs of the bitonic merger $M_{n+1}$. The N sorted outputs $z_{N+1}, z_{N+2} \ldots z_{2N}$ of the bitonic sorter $B_n^2$ are delivered to the second N inputs of the bitonic merger $M_{n+1}$ in reverse order, i.e., they are "flipped." For example, in FIG. 2, output $z_{N+1}$ of $B_n^2$ is connected to input $w_{2N}$ of $M_{n+1}$, the output $z_{n+2}$ is connected to the input $w_{2N-1}$, etc. Since the output vector from each bitonic sorter, $B_n^1$, $B_n^2$ is sorted, the input vector $w_1, w_2, \ldots w_{2N}$ to the bitonic merger $M_{n+1}$ is therefore bitonic. And since, as indicated above, the bitonic merger $M_{n+1}$ sorts bitonic input vectors, the output vector $y_1, y_2 \ldots y_{2N}$ is sorted.

Figure 3:
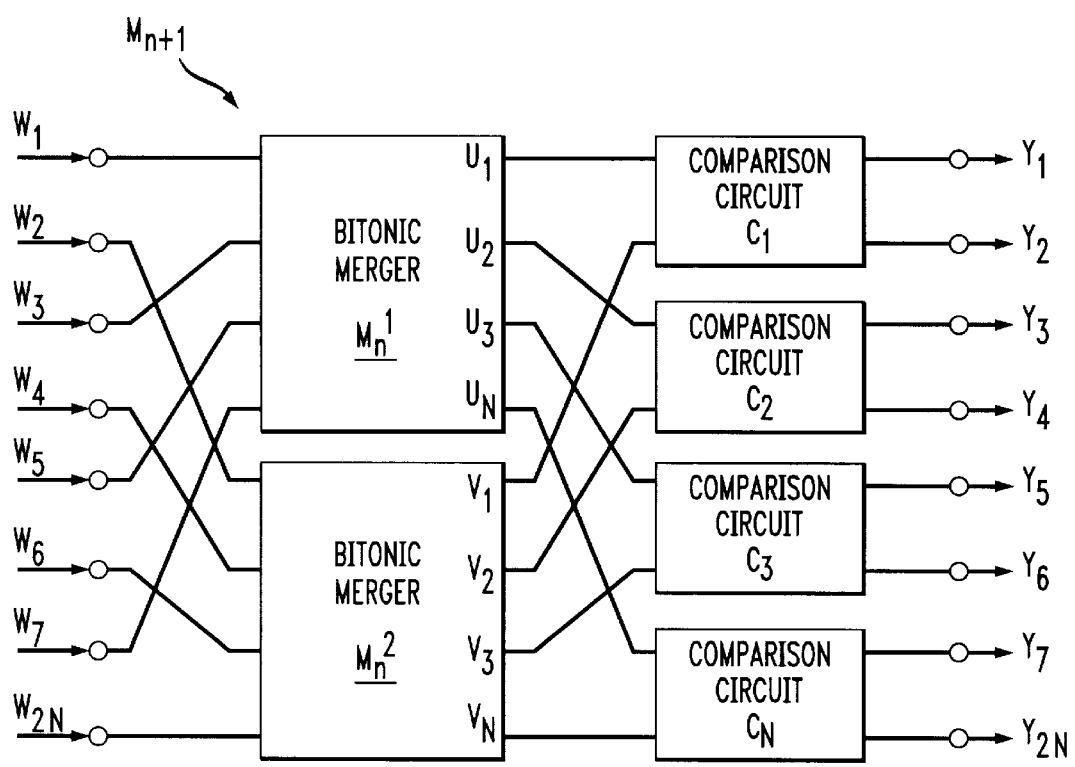
FIG. 3 shows detail of the bitonic merger, $M_{n+1}$.

FIG. 3 shows detail of the bitonic merger, $M_{n+1}$, which is constructed recursively. For consistency with FIG. 2, n=2 and N=4. As described above, the bitonic merger $M_{n+1}$ receives the bitonic input vector $w_1, w_2 \ldots w_{2N}$ and delivers the sorted output vector $y_1, y_2 \ldots y_{2N}$. The bitonic merger $M_{n+1}$ includes two mergers, an upper merger $M_n^1$ and a lower merger $M_n^2$, and N comparison circuits $C_1, C_2 \ldots C_N$.

All odd indexed inputs w are routed to upper merger $M_n^1$. Thus, $w_1, w_3, w_5, \ldots w_{2N-1}$ is the input vector to $M_n^1$. All even indexed inputs w are routed to lower merger $M_n^2$. As such, $w_2, w_4, w_6, \ldots w2_N$ is the input vector to $M_n^2$. Each of those "half-size" input vectors is bitonic. Since the mergers $M_n^1, M_n^2$ sort bitonic input vectors, output vector $u_1, u_2 \ldots u_N$ from upper merger $M_n^1$ and output vector $v_1, v_2 \ldots v_N$ from lower merger $M_n^2$ are sorted.

For i=1, 2 ... N, the outputs $u_i$ and $v_i$, are connected to the inputs of the comparison circuits $C_i$, e.g., $u_1$ and $v_1$ are connected to the inputs of $C_1$, and so forth. The outputs of $C_i$ are the outputs $y_{2i-1}$ and $y_{2i}$ of the bitonic merger $M_{n+1}$.

II. Improved Network Layouts According to the Present Invention

According to the present invention, an upper bound area of $4N^2$ grid units is achieveable for a "flip-bitonic" layout of Batcher's bitonic network. In mathematical parlance, and as applied to the network area requirements, an "upper bound" area of $4N^2$ grid units means that the sorting network can be implemented in less than or equal to $4N^2$ grid units. Thus, in the present context, it is advantageous to reduce the upper bound. It should be appreciated, however, that in other less preferred embodiments of the present invention, Batcher's bitonic sorting network can be implemented in an area greater than $4N^2$ grid units. This could be accomplished, for example, by not linking comparison circuits as efficiently as possible in accordance with the present teachings.

The upper bound area of $4N^2$ grid units, which represents a significant reduction in grid-space requirements, is achieved by (i) "slanting" a substantial portion of the interconnections or links so that they extend in a substantially non-orthogonal direction to the axes of a coordinate system such as is typically used in defining a grid for laying out a sorting network, (ii) delivering the N outputs $z_{N+1}, z_{N+2} \ldots z_{2N}$ of the lower bitonic sorter $B_n^2$ to the bitonic merger $M_{n+1}$ without "flipping" them, and (iii) not restricting comparison circuits having the same network depth to placement in a single grid column as in conventional layouts of sorting networks. For example, at least one group of comparison circuits that is organized in a grid column in the standard layout of Batcher's bitonic network is organized as a grid row in an improved layout according to the present invention. The aforementioned operations are described in more detail below.

For the purposes of the immediate description, w is defined as a binary word. The reversed word, $w^r$, is obtained by a left-right flip of w. It can be shown that if the binary word $w_1 w_2$ is bitonic, so is $w_1^r w_2^r$. Assume the $X_1 = x_1, x_2 \ldots X_N$, while $X_2 = x_{N+1}, x_{N+2} \ldots x_{2N}$. If $X_1 X_2$ is bitonic, $X_1 X_2^r$ is called "flip-bitonic." And, if $X_1 X_2$ is bitonic, $X_1^r X_2^r$ is also bitonic. Thus $X_1^r X_2$ is also flip-bitonic, as the term is used herein. As an example, take a bitonic binary word sequence (0,1,1,1,1,1,0,0). Flip-bitonic sequences can be created therefrom by reversing the order of the first four values: (1,1,1,0,1,1,0,0), or the second four values: (0,1,1,1,0,0,1,1).

Figure 4:
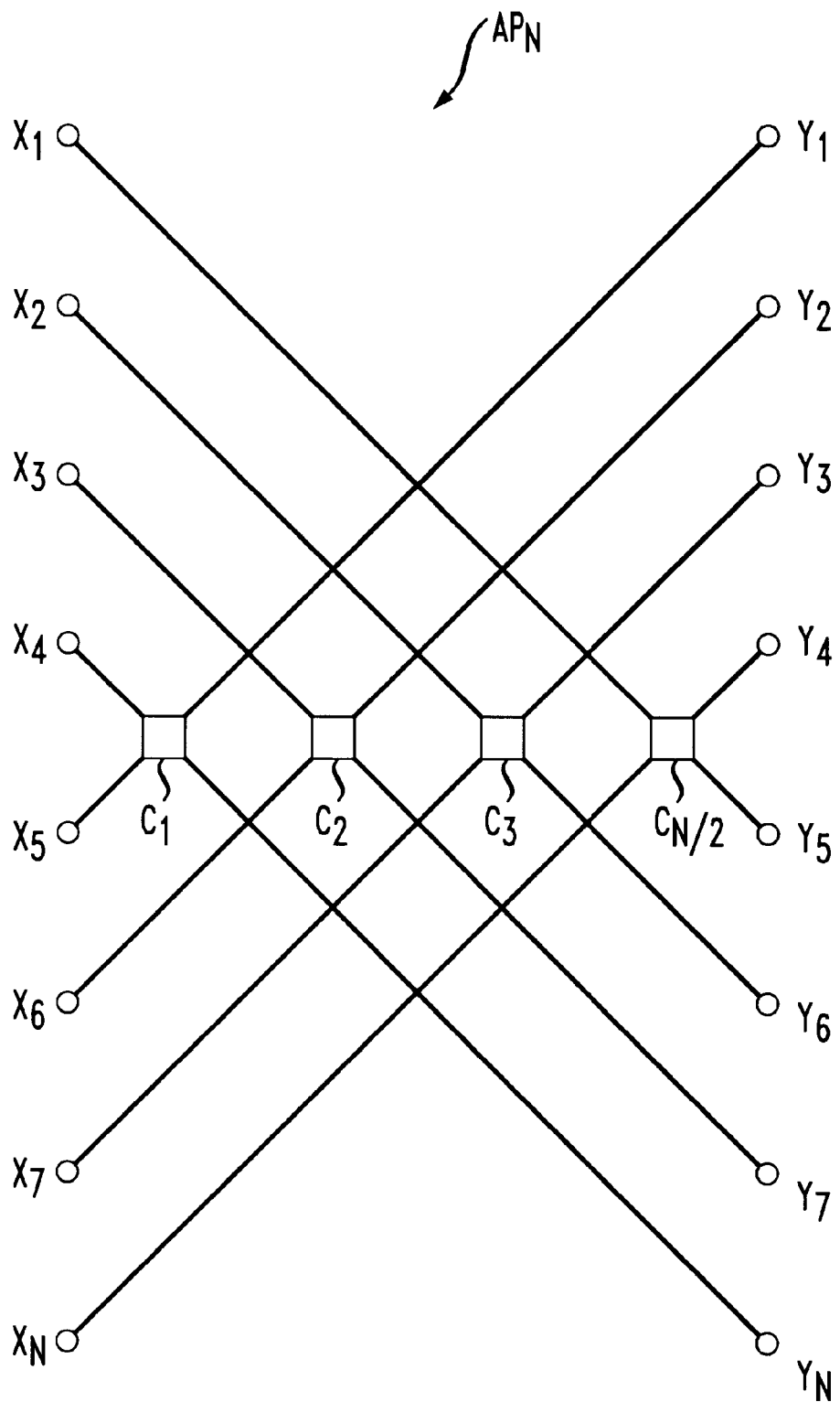
FIG. 4 shows an array portion $AP_n$ for n=3 of a flip-bitonic network $F_n$ layout according to the present invention.

FIG. 4 shows an array portion $AP_n$ of a flip-bitonic network $F_n$ layout according to the present invention. The array portion shown in FIG. 4 is for N=8. The array portion $AP_n$ consists of a grid column of input terminals $x_1, X_2 \ldots x_N$, an array of comparison circuits $C_1 - C_{N/2}$ placed horizontally rather than vertically as in the conventional layout of Batcher's bitonic network, and a grid column of output terminals $y_1, y_2 \ldots y_N$. The array portion $AP_n$ receives a flip-bitonic input vector and, at its outputs, segregates larger numbers from smaller numbers. For example, in the array shown in FIG. 4, the values appearing at terminals $y_5 - y_8$ are greater than or equal to the values appearing at $y_1 - y_4$. It will be appreciated by those skilled in the art that the layout of the array portion $AP_n$ shown in FIG. 4 is slanted 45° with respect to a conventional sorting network layout.

The array portion $AP_{n+1}$ receives an input vector $x_1, x_2 \ldots x_{2N}$, and an output vector $y_1, y_2 \ldots y_{2N}$ is produced at its output terminals. It can be shown that if the input vector $x_1, x_2 \ldots x_{2N}$ of the array portion $AP_{n+1}$ is binary and flip-bitonic, then its output vector $y_1, y_2 \ldots y_{2N}$ satisfies one of the following two conditions. The first condition is that the vector $y_1, y_2 \ldots y_N$ is all zeros and $y_{N+1}, y_{N+2} \ldots y_{2N}$ is bitonic, and the second condition is that the vector $y_{N+1}, y_{N+2} \ldots y_{2N}$ is all ones and $y_1, y_2 \ldots y_N$ is bitonic.

Figure 5:
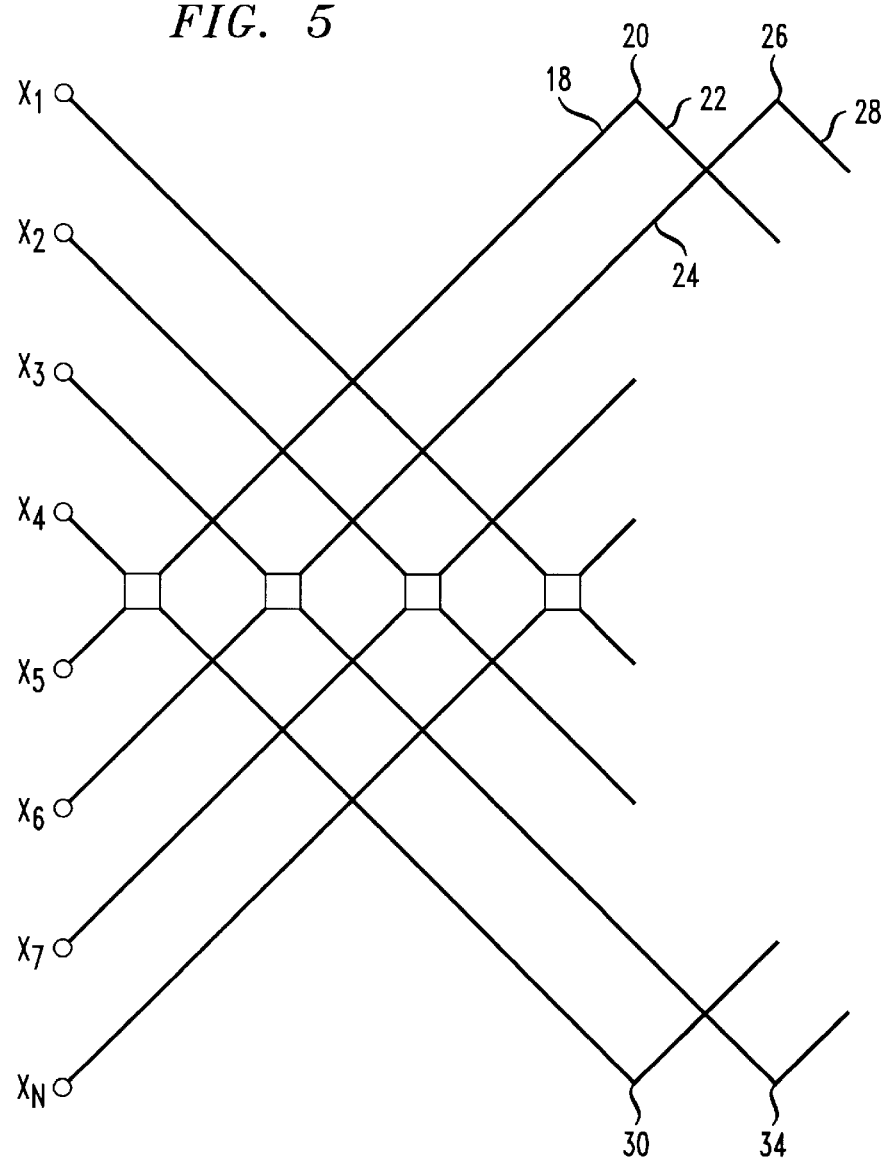
FIG. 5 shows the array portion of FIG. 4 after flip-linking.

In a further aspect of an improved layout according to the present invention, the array portion $AP_{n+1}$ of the network $F_{n+1}$ is "flip-linked," as shown in FIG. 5. The layout includes bends 20, 26, 30 and 34. Before the bends 20 and 26, the output link 18 is above the output link 24. Link 22 is attached to link 18 and link 28 is attached to link 24. As a result of the bends 20, 26, link 28 is above link 22. Thus, the interconnects or links have been "flipped."

Figure 6:
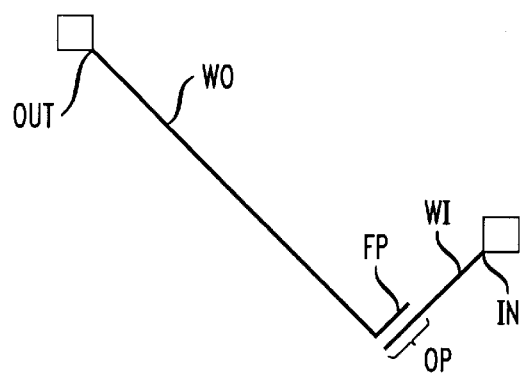
FIG. 6 shows a conceptual illustration of the operation of flip-linking.

A conceptual illustration of the operation of flip-linking is presented in FIG. 6. That Figure shows a link WO connected to an output OUT and a link WI connected to an input IN. The link WO has a portion FP that overlaps and is "fused" to a portion OP of the link WI.

Flip-linking converts each of the output vectors $y_1, y_2 \ldots y_N$ and $y_{N+1}, y_{N+2} \ldots y_{2N}$ from bitonic to "flip-bitonic." The flip-linking enables the connection of two half-size array portions to the output of an array network satisfying one of the aforementioned conditions. Such half-size array portions require their input to be flip-bitonic.

Figure 7:
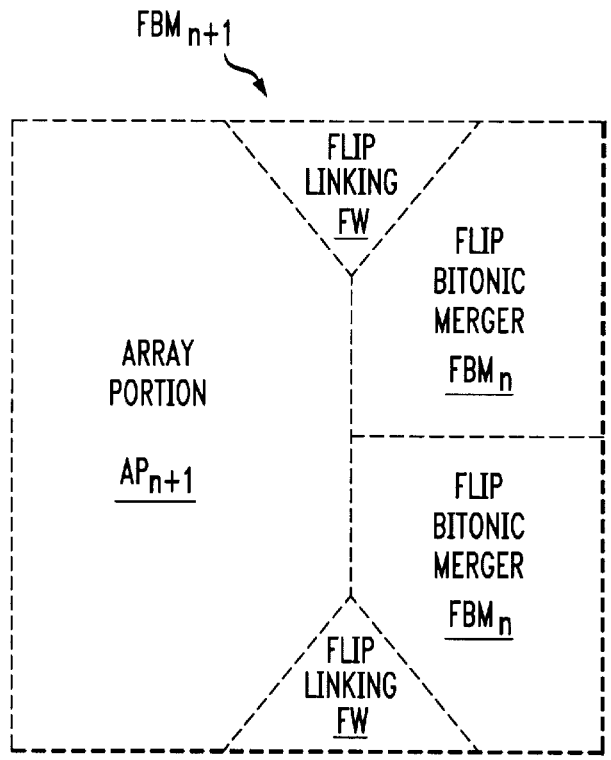
FIG. 7 shows a conceptual illustration of the tripartite construction of the portion $FBM_{n+1}$ of the flip-bitonic network layout that sorts flip-bitonic input vectors.
Figure 8A:
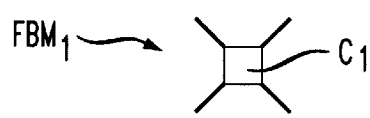
FIGS. 8a–8d show the construction of $FBM_n$ for n=1–4, respectively.
Figure 8B:
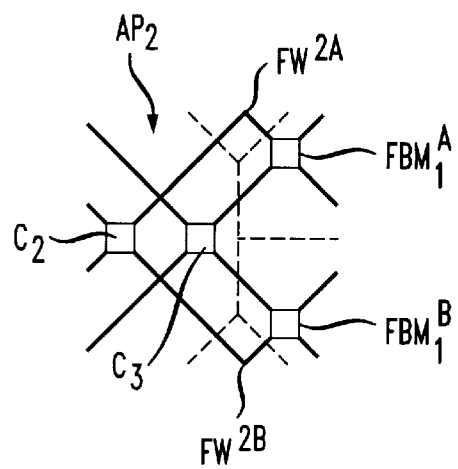
Figure 8C:
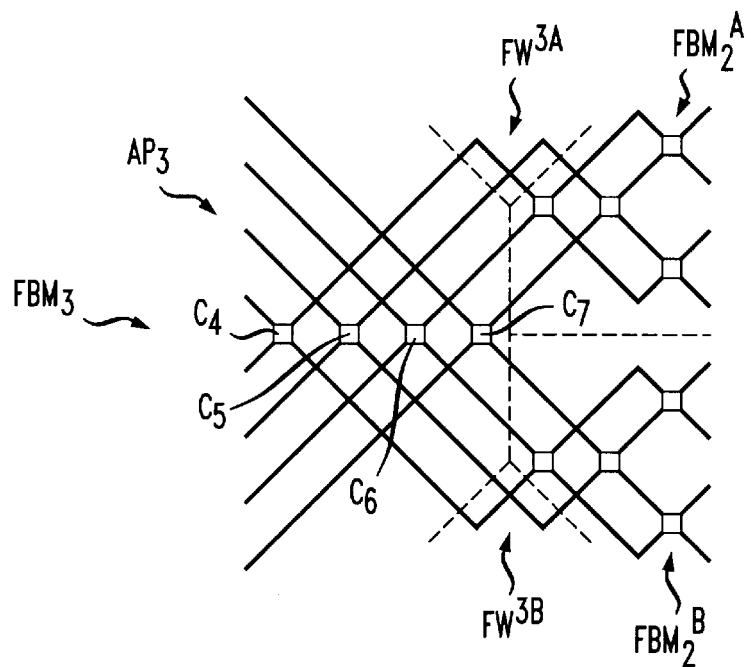
Figure 8D:
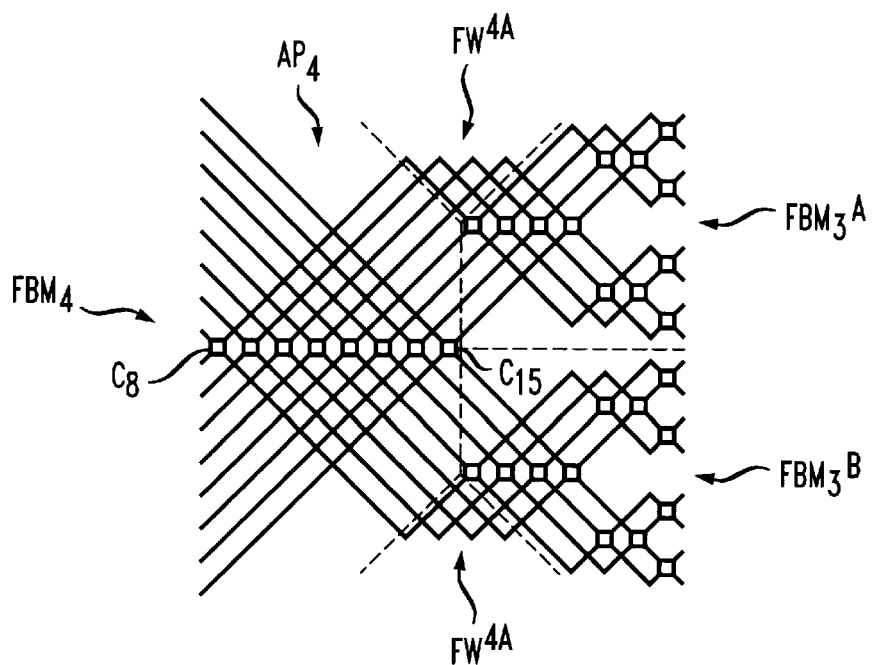

The construction of a portion $FBM_{n+1}$ of the network $F_{n+1}$ is described below. $FBM_{n+1}$ is constructed, recursively, from three parts: (i) the array portion $AP_{n+1}$ for $2N=2^{n+1}$ inputs; (ii) flip-linking FW for flipping 2 groups of N/2 interconnections; and (iii) two copies of $FBM_n$ for merging flip bitonic vectors. The tripartite construction of the portion $FBM_{n+1}$ is illustrated conceptually in FIG. 7.

The recursive construction of $FBM_{n+1}$ is apparent from the illustrations of $FBM_1$–$FBM_4$ shown in FIGS. 8a–8d. $FBM_1$, shown in FIG. 8a, consists of one comparison circuit $C_1$. The links connected to the inputs and the outputs of the comparison circuit $C_1$ are slanted 45° with respect to a conventional grid line layout. $FBM_2$, shown in FIG. 8b, includes two copies of $FBM_1$ identified as $FBM_1^A$ and $FBM_1^B$, the array portion $AP_2$ comprised of two comparison circuits $C_2$ and $C_3$, and flip-linking $FW^{2A}$ and $FW^{2B}$. Since only one link is present at each of $FW^{2A}$ and $FW^{2B}$, and it takes two links to cause a "flip," no flip occurs; there is simply a bend in the link. Similarly, $FBM_3$, shown in FIG. 8c, includes two copies of $FBM_2$ identified as $FBM_2^A$ and $FBM_2^B$, array portion $AP_3$ having four comparison circuits $C_4$–$C_7$, and flip-linking $FW^{3A}$ and $FW^{3B}$. Likewise, $FBM_4$, shown in FIG. 8d, includes two copies of $FBM_3$ identified as $FBM_3^A$ and $FBM_3^B$, array portion $AP_4$ having eight comparison circuits $C_8$–$C_{15}$, and flip-linking $FW^{4A}$ and $FW^{4B}$.

Figure 9:
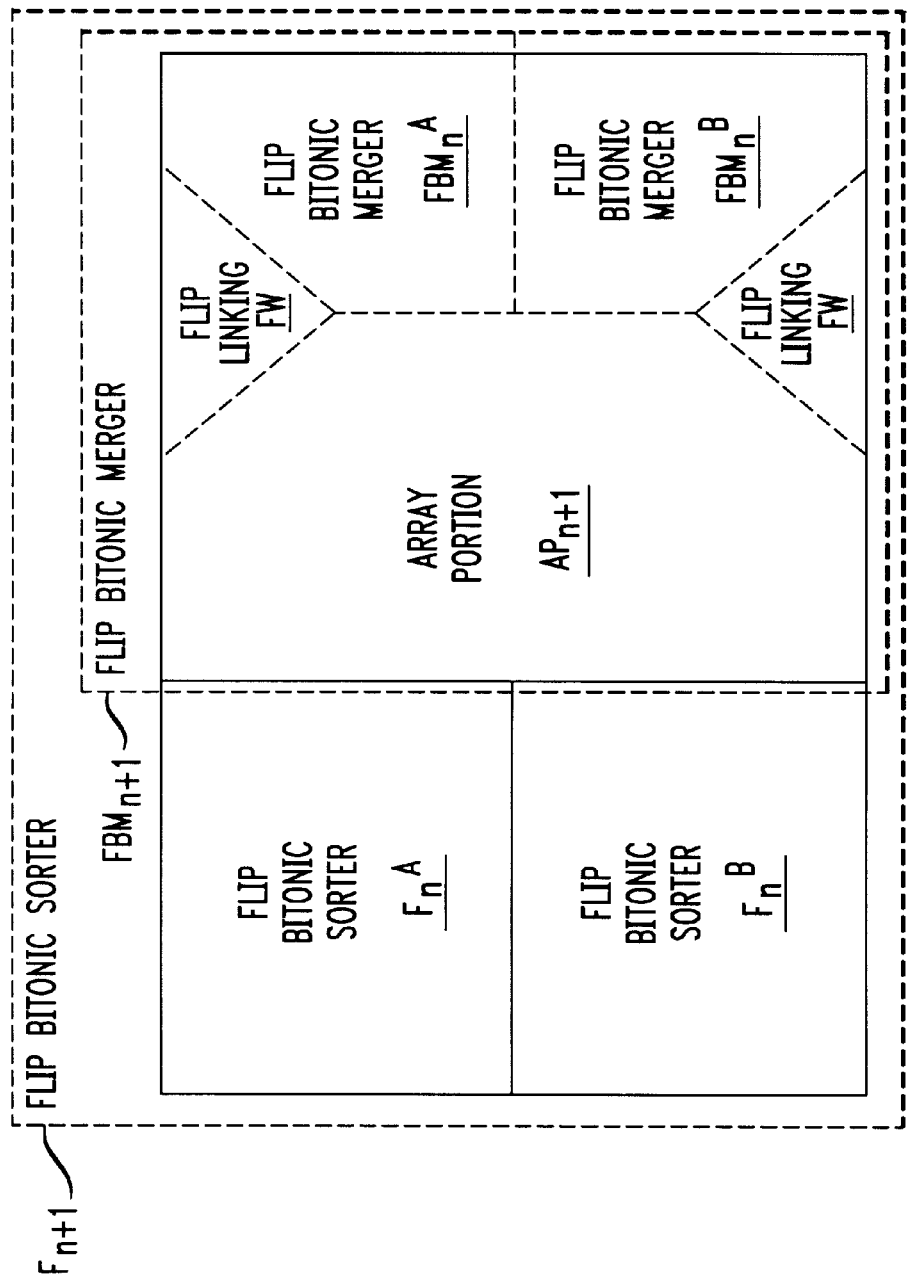
FIG. 9 shows a conceptual illustration of a complete flip-bitonic sorter layout according to the present invention.

A conceptual illustration of the various elements of a complete "flip-bitonic" sorter $F_n$ according to the present invention is shown in FIG. 9. To illustrate the recursive construction, the elements of $F_{n+1}$ are shown. The flip bitonic sorter $F_{n+1}$ includes upper and lower copies of the flip bitonic sorter $F_n$, and a copy of the flip bitonic merger $FBM_{n+1}$ described above. Each copy of the flip-bitonic sorter $F_n$ receives $2^n$ inputs and produces $2^n$ sorted outputs. The outputs from both sorters $F_n$, which total $2^{n+1}$, are delivered to the inputs of $FBM_{n+1}$. Thus, the input vector to $FBM_{n+1}$, which has a length of $2^{n+1}$, is flip-bitonic. As such, $FBM_{n+1}$ sorts the input vector.

Figure 10:
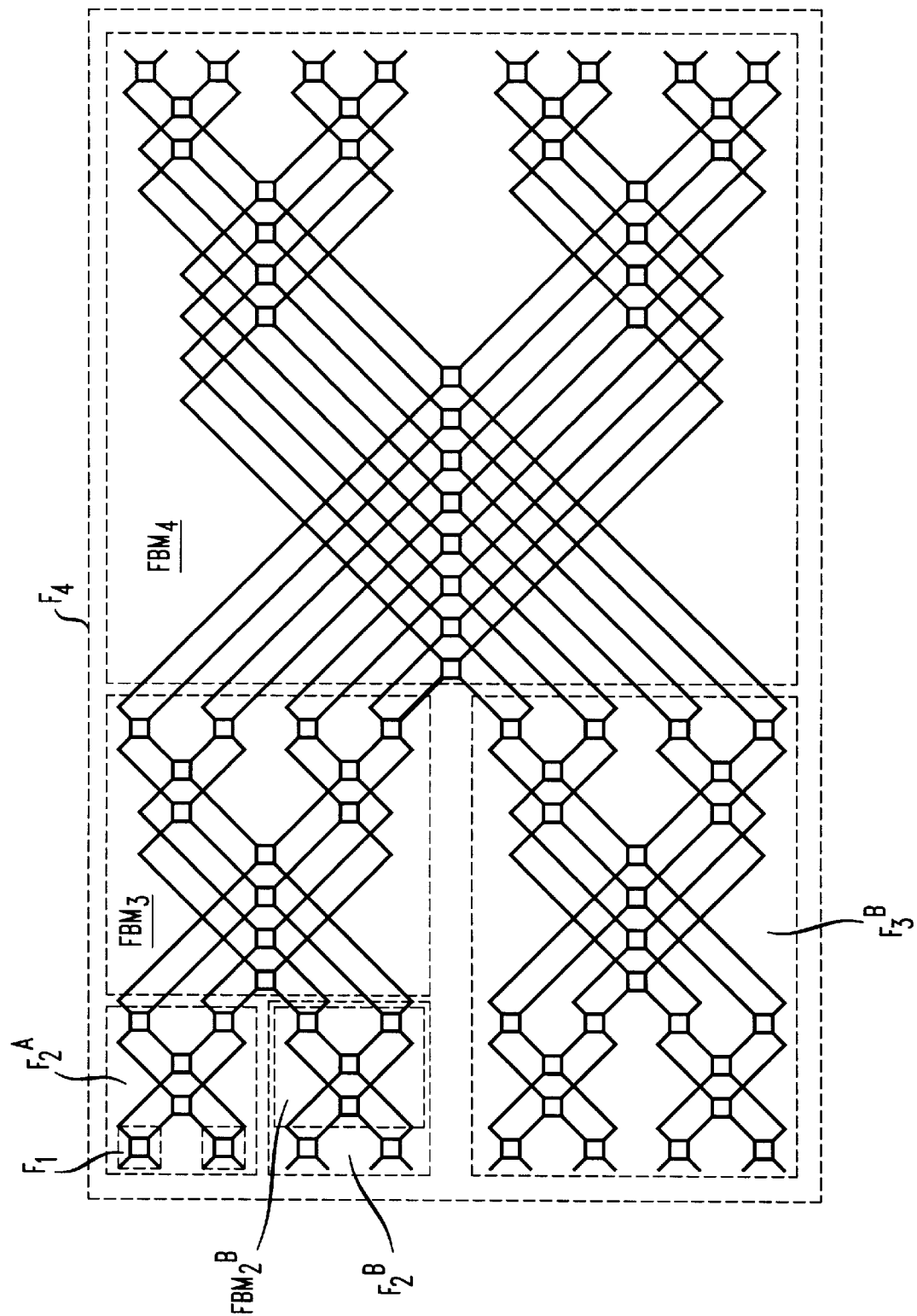
FIG. 10 shows the construction of the flip-bitonic sorter for n=4.

A complete "flip-bitonic" sorter $F_n$ for n=4 is shown in FIG. 10. $F_1$ is a single comparison circuit, with input and output links attached at 45° to the standard grid lines, as for $FBM_1$. There are ½·($2^n$)=8 copies of $F_1$ for receiving $2^n$=16 inputs. $F_2$ consists of upper and lower $F_1$ sorters, the outputs of which are attached to flip bitonic merger $FBM_2$. $F_3$ consists of upper and lower $F_2$ sorters attached to flip bitonic merger $FBM_3$. Finally, $F_3$ consists of upper and lower $F_3$ sorters attached to flip bitonic merger $FBM_4$.

Those familiar with sorting networks will recognize that the layout of the present flip-bitonic sorter $F_n$ is distinct from previous layouts of Batcher's bitonic sorter in a number of aspects. Among other distinctions, the present flip-bitonic sorter includes links that are slanted at 45°, flip linking, and a horizontal arrangement, i.e., placement in grid rows, of certain same-network-depth comparison circuits. Such features are unknown in prior sorting network layouts, and result in significant advantages for the present flip-bitonic sorter, some of which are described below.

Notwithstanding the significant differences in physical layout, the present flip-bitonic sorter and Batcher's bitonic sorter are isomorphic. The term isomorphic, as used herein, is meant to indicate structural equivalence implying that the present flip-bitonic sorter is characterized by the same depth, i.e; $O(\log^2 N)$ and number of comparison circuits, i.e., $O(N \log^2 N)$, as Batcher's bitonic sorter. For a further description of the term "isomorphic," as used in conjunction with networks generally, and, more particularly, as intended herein, see G. Bilardi entitled "Merging and Sorting Networks with the Topology of the Omega Network," IEEE Trans. Comp., v(38), no. 10, pp. 1396–1403, October 1989.

Notwithstanding the aforementioned isomorphism, the grid-area required by the present flip-bitonic sorter is significantly less than that required for previous layouts of Batcher's bitonic sorter. The present flip-bitonic sorter is enclosed by a rectangle having a height $\sqrt{2}\cdot(N-1)$ grid segments and a length $\sqrt{2}\cdot(2N-(2+\log N))$ grid segments. The grid area is thus upper bounded by $4N^2$ grid units.

Furthermore, as can be seen by referring to FIG. 10, the architecture of the present improved layout is such that there is at most one bend in each interconnection between any two linked comparison circuits. Prior art layouts of Batcher's bitonic network typically have as many as four or more bends between some pairs of comparison circuits.

Batcher's sorting networks have been used in a variety of applications. As sorters, such networks find application to computing. Due to their structure, such networks are particularly useful in parallel computing applications for instruction and/or data routing to corresponding processors or memory cells used in such applications. Additionally, since such networks function as self-routing switching networks, they are useful in a variety of communications applications, such as, for example, broad band ISDN as well as in conventional data and/or telecommunications networks. See Weste and Eshraghian, *Principles of CMOS VLSI Design*, Section 9.4, (Addison Wesley, 1985). The improved layouts described herein may be used advantageously, in the same applications, to minimize the area required to physically implement the sorting network on one or more integrated circuits.

Figure 11:
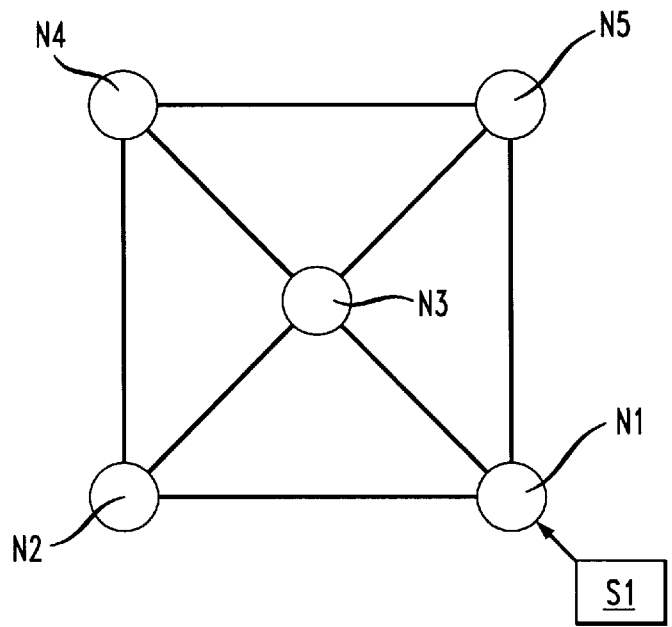
FIG. 11 shows a simplified diagram of a portion of an asynchronous transfer mode network.

In the following nonlimiting example, improved layouts according to the present invention are used as the "switch fabric" of an asynchronous transfer mode (ATM) switch. FIG. 11 shows a portion of an ATM network having nodes N1–N5. In the example shown in FIG. 11, a single source S1 delivers data onto the network at N1 for delivery to other nodes in the network, such as nodes N2–N5. It should be appreciated that in other embodiments, such a network may receive data from multiple sources. Each of the nodes has an ATM node switch, not shown in FIG. 1e, for routing data to other nodes in the network. A simplified diagram of an ATM node switch according to the present invention is shown in FIG. 12.

Figure 12:
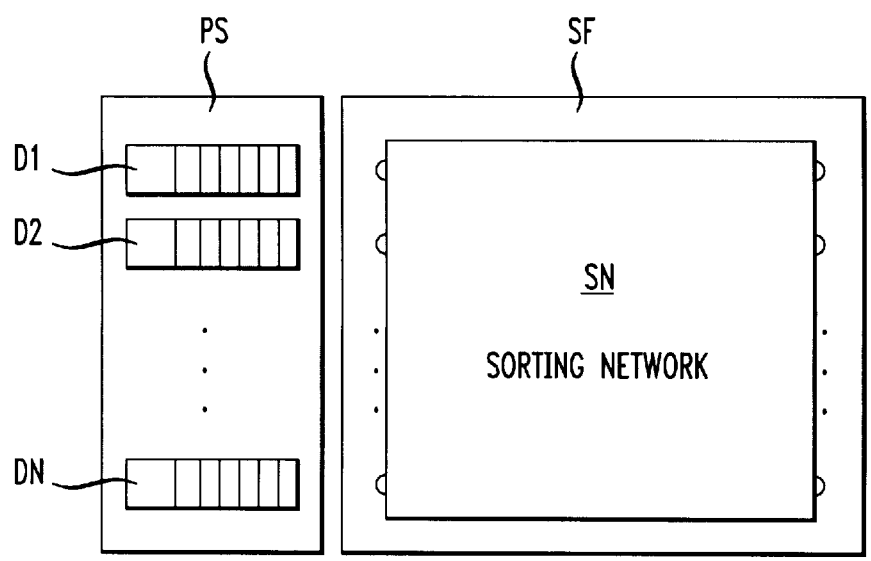
FIG. 12 shows a simplified diagram of a switch.

As shown in FIG. 12, data packets D1–DN are received by the ATM node switch and stored in buffers for preprocessing in preprocessing stage PS. In addition to information content, the data packets include routing or address data indicating the intended destination of the information content. In the preprocessing stage PS, decisions are made by known methods concerning the order of data flow into switch fabric SF, which is a sorting network SN having an improved layout as described herein. From the buffers, the data is deliver ed synchronously into the switch fabric SF, and routed to the appropriate node.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

I claim:

1. A sorting network, comprising:

N network input terminals for receiving N signals, said N signals representative of values;

N network output terminals to which sorted signals are delivered, the sorted signals representing the N signals sorted according to their values;

a plurality of comparison circuits, wherein:
  each said comparison circuit has two inputs and two outputs;
  each said comparison circuit has a network depth, said network depths having an order from minimum to maximum; and
a plurality of links, wherein:
  a first portion of said plurality of links connect a network input terminal to an input of a comparison circuit having minimum network depth;
  a second portion of said plurality of links connect said two outputs of each said comparison circuit to the inputs of comparison circuits having greater network depth, if there are any;
  a third portion of said plurality of links connect the each outputs of a comparison circuit having maximum network depth to a network output terminal;
characterized in that, in a layout of the sorting network:
a first portion of the plurality of comparison circuits are arranged in grid columns, wherein comparison circuits within the same grid column have the same network depth, and not all comparison circuits having equal network depth are placed in the same grid column.

2. The sorting network of claim 1, and further wherein a second portion of the plurality the comparison circuits are arranged in a plurality of grid rows, wherein each grid row is defined by adjacent comparison circuits and all comparison circuits within a grid row have equal network depth.

3. The sorting network of claim 2, and further wherein a first and a second grid row have the same network depth.

4. The sorting network of claim 2, wherein the grid rows and grid columns define a two-dimensional coordinate system, and further wherein a substantial portion of each link extends in a substantially non-orthogonal direction to an axis of the coordinate system.

5. The sorting network of claim 4 wherein the substantially non-orthogonal direction is 45 degrees.

6. The sorting network of claim 1, wherein, when the network is channel-routed such as to develop a layout of the network to be embodied in a circuit, substantially every link between any two comparison circuits has no more than one bend.

7. The sorting network of claim 1 wherein the network is isomorphic to Batcher's bitonic network.

8. The sorting network of claim 7 wherein the sorting network is characterizable by a grid layout, and the grid layout requires an area of $4N^2$ grid units or greater.

9. A flip bitonic sorting network $F_n$ having a recursive construction, wherein $F_{n+1}$ comprises:
  an upper sorter $F_n^1$ and a lower sorter $F_n^2$, each for sorting $2^n$ inputs, the upper and lower sorters operable, collectively, to provide a flip-bitonic vector of length $2^{n+1}$; and
  a flip-bitonic merger $FBM_{n+1}$ having $2^{n+1}$ inputs attached to the $2^n$ outputs from each of the upper and lower sorters thereby receiving the flip-bitonic vector therefrom, and operable to sort the flip-bitonic input vector, the flip-bitonic merger $FBM_{n+1}$ comprising:
    an array $AP_{n+1}$ for receiving the $2^{n+1}$ inputs, the array having $2^n$ comparison boxes;
    flip-links for flipping 2 groups of $2^{n-1}$ outputs from $2^{n-1}$ of the comparison boxes; and
    an upper flip-bitonic merger $FBM_n^1$ and a lower flip bitonic merger $FBM_n^2$ for sorting flip-bitonic vectors, wherein,
  the upper sorter $F_n^1$, the lower sorter $F_n^2$ and the flip-bitonic merger $FBM_{n+1}$ are comprised of interconnected comparison circuits.

10. A sorting network having:
a number N of network inputs for receiving an input vector of up to N signals, wherein at least a portion of each of the signals represent values;
a plurality of comparison circuits, wherein:
  said plurality of comparison circuits are arranged in grid columns and grid rows defining a two-dimensional coordinate system;
  each said comparison circuit has two inputs and two outputs;
  each said comparison circuit has a network depth, said network depths have an order from minimum to maximum;
  network inputs are connected to said two inputs of comparison circuits having minimum network depth;
  comparison circuits having maximum network depth are connected, at their outputs, to network outputs; and
links that connect said two outputs of comparison circuits to said two inputs of comparison circuits having a greater network depth;
characterized in that a substantial portion of each link extends in a substantially non-orthogonal direction to an axis of said two-dimensional coordinate system.

11. A sorting network, comprising:
network input terminals for receiving a collection of values and network output terminals at which the same collection of values appears, but sorted;
a plurality of comparison circuits each having inputs and outputs; wherein:
  each said comparison circuit is operable to sort two values fed to its inputs and deliver said sorted two values to its outputs; and further wherein:
  said plurality of comparison circuits are arranged in a matrix by network depth, wherein
    said network depth is indicative of the number of sorting operations performed on said values; and
    said network depth has an order from minimum to maximum, wherein the minimum network depth is one;
    a first group of said comparison circuits having equal network depth is arranged in a grid row; and
    a second group of comparison circuits having equal network depth is arranged in a grid column; and
a plurality of links, wherein:
  a first group of said links connect network input terminals to said inputs of comparison circuits having a network depth of one;
  a second group of said links connect said outputs of comparison circuits to inputs of comparison circuits at a greater network depth;
  a third group of said links connect said outputs of the comparison circuits having maximum network depth to said network output terminals.

12. A method for laying out a sorting network having a plurality of comparison circuits comprising arranging a first portion of said plurality of comparison circuits in grid rows, wherein:
said plurality of comparison circuits are arranged in by network depth;
said network depth has an order from minimum to maximum; and
comparison circuits in said first portion having equal network depth are arranged in one of either:
  a single grid row, or in different grid rows forming part of a single grid column.

13. The method of claim 12, and further comprising the step of:

linking each comparison circuit in the network directly to at least one other comparison circuit by links, wherein a substantial portion of each link extends in a substantially non-orthogonal direction away from an axis defined by the grid rows of comparison circuits.

14. The method of claim 13, and further comprising the step of:

flip linking one half of the links that are connected to inputs of comparison circuits forming first and second flip-bitonic mergers for merging flip-bitonic vectors.

15. The method of claim 12, wherein the sorting network is a flip-bitonic sorting network $F_n$, and wherein a second portion of the plurality of comparison circuits are arranged one on top of the other in grid columns, and wherein the step of arranging further comprises:

recursively constructing the sorting network $F_{n+1}$ from the plurality of comparison circuits, which comparison circuits are organized to form:

first and second flip-bitonic sorting networks $F_n^1$ and $F_n^2$ which are operable, collectively, to provide a flip-bitonic vector of length $2^{n+1}$; and a flip-bitonic merger $FBM_{n+1}$ including an array $AP_{n+1}$ having $2^{n+1}$ inputs for receiving the flip-bitonic vector, the array having $2^n$ comparison circuits; and first and second flip-bitonic mergers $FBM_n^1$ and $FBM_n^2$ for merging flip-bitonic vectors received from the array portion.

16. A switch for routing data signals comprising address information to a network node, comprising:

a preprocessing stage that receives said data signals and that orders flow of said data signals; and a switch fabric that receives the ordered data signals from said preprocessing stage, said switch fabric including a sorting network, wherein:

said sorting network is operable to route each data signal to an appropriate network node based on said address information, said address information having a value, the sorting network comprising:

network input terminals for receiving signals representative of said address information;

network output terminals at which said received signals appear, but sorted by value;

a plurality of comparison circuits each having inputs and outputs; wherein:

each said comparison circuit is operable to receive two signals at its inputs and deliver said two signals to its outputs, but sorted;

said plurality of comparison circuits are arranged in a matrix by network depth, wherein said network depth has an order from minimum to maximum;

a first group of said comparison circuits having equal network depth is arranged in a grid row; and a second group of comparison circuits having equal network depth is arranged in a grid column.

* * * * *